United States Patent
Hutchings et al.

(10) Patent No.: US 10,113,581 B2
(45) Date of Patent: Oct. 30, 2018

(54) BODY ISOLATOR AND BOLT RETENTION ASSEMBLY

(71) Applicants: Jonathan A Hutchings, Auburn Hills, MI (US); Brian D Dwyer, Ortonville, MI (US)

(72) Inventors: Jonathan A Hutchings, Auburn Hills, MI (US); Brian D Dwyer, Ortonville, MI (US)

(73) Assignee: FCA US LLC, Auburn Hills, MI (US)

( * ) Notice: Subject to any disclaimer, the term of this patent is extended or adjusted under 35 U.S.C. 154(b) by 126 days.

(21) Appl. No.: 15/386,603

(22) Filed: Dec. 21, 2016

(65) Prior Publication Data

US 2018/0172059 A1    Jun. 21, 2018

(51) Int. Cl.
*F16B 21/18* (2006.01)
*F16B 41/00* (2006.01)

(52) U.S. Cl.
CPC ............ *F16B 41/002* (2013.01); *F16B 21/18* (2013.01)

(58) Field of Classification Search
CPC ........ F16B 21/18; F16B 41/00; F16B 41/002; F16B 43/00
USPC ................................. 411/352, 353, 427, 432
See application file for complete search history.

(56) References Cited

U.S. PATENT DOCUMENTS

| | | | |
|---|---|---|---|
| 2,460,613 A | 2/1949 | Whelan et al. | |
| 2,568,584 A | 9/1951 | Hartman | |
| 3,180,388 A * | 4/1965 | Newcomer, Jr. | F16B 5/0208 411/353 |
| 3,217,774 A * | 11/1965 | Pelochino | F16B 5/0208 411/353 |
| 3,294,140 A * | 12/1966 | Cosenza | F16B 5/0208 411/105 |
| 3,868,806 A * | 3/1975 | Dey | F16B 5/0208 411/353 |
| 3,896,867 A * | 7/1975 | Gill | F16B 5/0208 411/353 |
| 4,396,327 A | 8/1983 | Menke | |
| 4,723,881 A * | 2/1988 | Duran | F16B 5/0208 411/112 |
| 4,735,536 A * | 4/1988 | Duran | F16B 5/01 411/103 |
| 4,747,738 A * | 5/1988 | Duran | F16B 5/0208 411/107 |

(Continued)

*Primary Examiner* — Roberta S Delisle
(74) *Attorney, Agent, or Firm* — Ralph E Smith

(57) ABSTRACT

Bolt retention threads are provided adjacent the proximal end of the body coupling aperture of a body isolator. A bolt has cooperating bolt retention threads and body coupling threads on the shaft. These body coupling threads have a diameter to permit the external body coupling threads to pass through the internal bolt retention threads without requiring threaded engagement therebetween. The cooperating bolt retention threads are axially positioned relative to each other to enable the entirety of the external bolt retention threads to be threaded completely through the internal bolt retention threads to capture the bolt within the body coupling aperture in a captured floating configuration. In the captured floating configuration, the external body coupling threads and the distal end of the shaft extend out of the distal end of the body coupling aperture and the bolt is allowed to float laterally within the body coupling aperture.

12 Claims, 5 Drawing Sheets

(56) References Cited

U.S. PATENT DOCUMENTS

| | | | | |
|---|---|---|---|---|
| 4,963,063 A | * | 10/1990 | Gulistan | F16B 5/0208 |
| | | | | 403/DIG. 12 |
| 5,066,180 A | * | 11/1991 | Lang | F16B 37/044 |
| | | | | 411/103 |
| 5,083,889 A | * | 1/1992 | Steinbock | B21B 27/035 |
| | | | | 403/320 |
| 5,154,559 A | | 10/1992 | Wagner | |
| 5,711,711 A | | 1/1998 | Schmidt, Jr. | |
| 6,582,171 B2 | | 6/2003 | Bondarowicz et al. | |
| 6,872,040 B2 | | 3/2005 | Deeg et al. | |

* cited by examiner

BODY ISOLATOR AND BOLT RETENTION ASSEMBLY

FIELD

The present disclosure relates to a body isolator and bolt retention assembly for a body-on-frame vehicle.

BACKGROUND

Body isolators are used to couple a frame to a body of a body-on-frame vehicle. Such body isolators include a resilient isolator to limit or reduce the emanation into the body of vibrations in frame. In some cases, the body isolator is first bolted to the frame; after which the frame is transferred down the assembly line to a body and frame joining station. It is desirable to have the body coupling bolt captured by the body isolators at the time the body is joined to the frame. In this way, the body coupling bolts are presented as part of the body isolator assembly to facilitate automated decking fastening. In order to account for tolerance variations, it is desirable that the captured body coupling bolts are able to float laterally.

One known option for capturing the body coupling bolt is to use a push on Tinnerman nut. Insure the proper placement of Tinnerman nuts on the body coupling bolts requires holding the head of the body coupling bolt against one side of the body isolator and fully pushing the Tinnerman nut against the opposite side of the body isolator. This requires simultaneous access to both sides, which is not always easy. In addition, placement of Tinnerman bolts is not always done correctly, causing them to interfere with proper alignment of the bolt or tightening of the nut onto the bolt.

Another known option is to provide a spring loaded bolt retention mechanism within the body coupling aperture of the body isolator to capture the bolt. Such systems are larger and do not allow sufficient lateral float. In addition, once the bolt is inserted, the bolt cannot be removed without destroying the bolt retention mechanism.

Another known option is to provide a foam ring or 'stay-put' polymer between the bolt and the body coupling aperture. When these materials are flexible enough to allow the bolt to float laterally sufficiently enough, they typically do not adequately secure or capture and retain the bolt with friction alone. Conversely, when these materials are rigid or large enough to securely capture the bolt within the body coupling aperture, they typically do not allow sufficient lateral float of the bolt.

The body isolator bolt retention assembly disclosed herein variously provides a relatively simple, foolproof, robust, and removable bolt retention solution.

SUMMARY

In accordance with an aspect of the present disclosure, a body isolator and bolt retention assembly for a body on a frame vehicle includes a body isolator. The body isolator has an outer sleeve, an inner sleeve, and a resilient material extending between and coupling the inner and outer sleeves together. The inner sleeve includes a body coupling aperture extending therethrough that has a proximal end and a distal end. Internal bolt retention threads are provided adjacent the proximal end of the body coupling aperture. A bolt includes a head and a shaft. The shaft has a proximal end adjacent the head and an opposite distal end. The bolt has cooperating external bolt retention threads adjacent the proximal end of the shaft and has external body coupling threads adjacent the distal end of the shaft. The external body coupling threads have a major diameter that is smaller than a minor diameter of the internal bolt retention threads to permit the external body coupling threads to pass through the internal bolt retention threads without requiring threaded engagement therebetween. The internal and cooperating external bolt retention threads are axially positioned relative to each other to enable the entirety of the external bolt retention threads to be threaded completely through the internal bolt retention threads to capture the bolt within the body coupling aperture in a captured floating configuration. In the captured floating configuration, the external body coupling threads and the distal end of the shaft extend out of the distal end of the body coupling aperture and the bolt is allowed to float laterally within the body coupling aperture.

In other aspects of the present disclosure, the internal bolt retention threads are provided on an annular insert that is press-fit into the body coupling aperture, and the annular insert is a molded plastic insert.

In another aspect of the present disclosure, the internal and external bolt retention threads have a thread pitch that is larger than a thread pitch of the external body coupling threads.

In another aspect of the present disclosure, the internal and external bolt retention threads cooperate to enable the entirety of the external bolt retention threads to be threaded completely through the internal bolt retention threads in less than about 10 threaded revolutions of the bolt.

In another aspect of the present disclosure, the outer sleeve includes at least one flange portion having a plurality of frame coupling apertures.

In another aspect of the present disclosure, the body isolator and bolt retention assembly further includes a washer mounted via a washer aperture on the shaft between the head and the external bolt retention threads. The washer aperture has a diameter that is less than the major diameter of the external bolt retention threads.

In another aspect of the present disclosure, the internal and cooperating external bolt retention threads are axially positioned relative to each other to additionally allow axial movement of the bolt within the body coupling aperture in the captured floating configuration.

In another aspect of the present disclosure, when in the captured configuration, the bolt is allowed to float laterally within the body coupling aperture a distance of at least about 2.0 mm from a central position in any direction.

In another aspect of the present disclosure, the bolt is removable from the body retention aperture by reverse-threading the entirety of the external bolt retention threads completely through the internal bolt retention threads.

In another aspect of the present disclosure, the body isolator bolt retention assembly additionally has a retention thread engagement configuration in which the internal and external bolt retention threads are threadably engaged with each other.

In another aspect of the present disclosure, the body isolator bolt retention assembly further includes a body coupling nut having cooperating internal body coupling threads. The body isolator bolt retention assembly additionally has a final assembly configuration in which the internal and external body coupling threads are tightened to prevent both axial and lateral movement of the bolt within the body coupling aperture.

DRAWINGS

The present invention will become more fully understood from the detailed description and the accompanying drawings.

DETAILED DESCRIPTION

Figure 1:
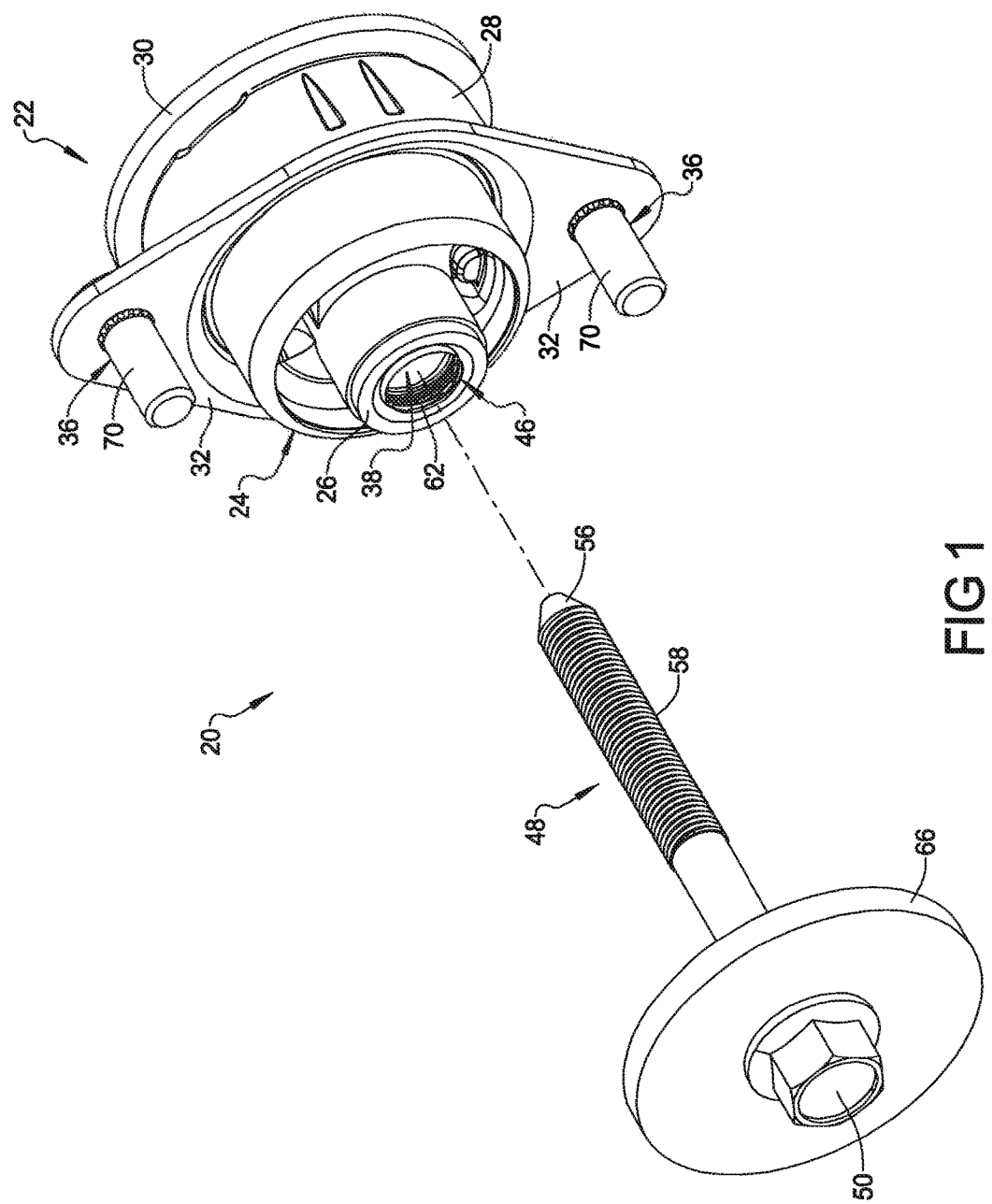
FIG. 1 is an exploded perspective view of one exemplary body isolator bolt and retention assembly for a body-on-frame vehicle in accordance with the present disclosure.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

FIGS. 1-5 illustrate one exemplary body isolator and bolt retention assembly 20 and its use for a body-on-frame vehicle in accordance with the present disclosure. The body isolator 22 includes an outer sleeve 24, an inner sleeve 26, and a resilient material 28 extending between and coupling the inner sleeve 26 and the outer sleeve 24 together.

The inner sleeve 26 defines a central body coupling aperture 38 extending between a proximal end 40 and a distal end 42. An end cap 30 is also press-fit to the inner sleeve 26 at the distal end 42 of the body coupling aperture 38. An annular, internally threaded insert 46 is press-fit into the proximal end 40 of the body coupling aperture 38. Thus, internal bolt retention threads 62 are provided adjacent the proximal end 40 of the body coupling aperture 38.

A body coupling bolt 48 includes a head 50 and a shaft 52. The shaft 52 of the bolt 48 has a proximal end 54 adjacent the head 50 and an opposite distal end 56. The distal end 56 is provided with a truncated cone, MAT or KUKA point shape. The bolt 48 has external body coupling threads 58 extending along the shaft 52 adjacent its distal end 56. External bolt retention threads 60 are also provided along the shaft 52 adjacent its proximal end 54.

The major (largest) diameter of the external body coupling threads 58 is less than the minor (smallest) diameter of the external bolt retention threads 60. The external bolt retention threads 60 of the bolt 48 are the corresponding or cooperating threads to the internal bolt retention threads 62 of insert 46. Thus, the external body coupling threads 58 have a major diameter that is less than the minor diameter of the internal bolt retention threads 62 of the insert 46. As a result, the external body coupling threads 58 of the bolt 48 are able to pass axially through the internal bolt retention threads 62 of the insert 46 without requiring threaded engagement therebetween.

A washer 66 is mounted on the shaft 52 of the bolt 48 and is captured between its head 50 and its bolt retentions threads 60. In this example, the washer 66 is mounted on the shaft 52 adjacent the head 50 prior to rolling or forming the bolt retention threads 60. As an example, the bolt retention threads 60 are M14 threads and the washer 66 has a 12 mm diameter aperture 68. As an alternative to rolling or forming the bolt retention threads 60 directly on the shaft 52, an annular insert carrying the external bolt retention threads 60 is press-fit onto an enlarged diameter portion of the shaft 52, thereby capturing the washer 66.

In this example, the inner sleeve 26 and the outer sleeve 24 are made of steel, the end cap 30 is made of aluminum, the resilient material 28 is made of rubber, and the threaded insert 46 is made of plastic. The outer sleeve 24 of the body isolator 22 includes two extending flange portions 32. Each flange portion 32 includes a frame coupling aperture 34. A frame coupling bolt 36 is press-fit into each frame coupling aperture 34. The frame coupling bolts 36 and corresponding nuts 80 are used to couple the body isolator 22 to the frame 44 of a body-on-frame vehicle. Typically, several body isolators 22 are coupled to the frame 44 for coupling the body 64 to the frame with an isolating resilient material 28 therebetween.

Simultaneous access to both sides of the frame 44 alone as necessary to couple the body isolators 22 thereto is relatively unimpeded. Additionally, it is typically easier in a manufacturing line to tighten nuts onto upwardly extending bolts, such as frame coupling bolts 36 and nuts 80. Thus, coupling the body isolators 22 to the frame is typically done with the threaded shafts 70 of the frame coupling bolts 36 extending upwardly as illustrated in FIGS. 2 and 3.

Figure 2:
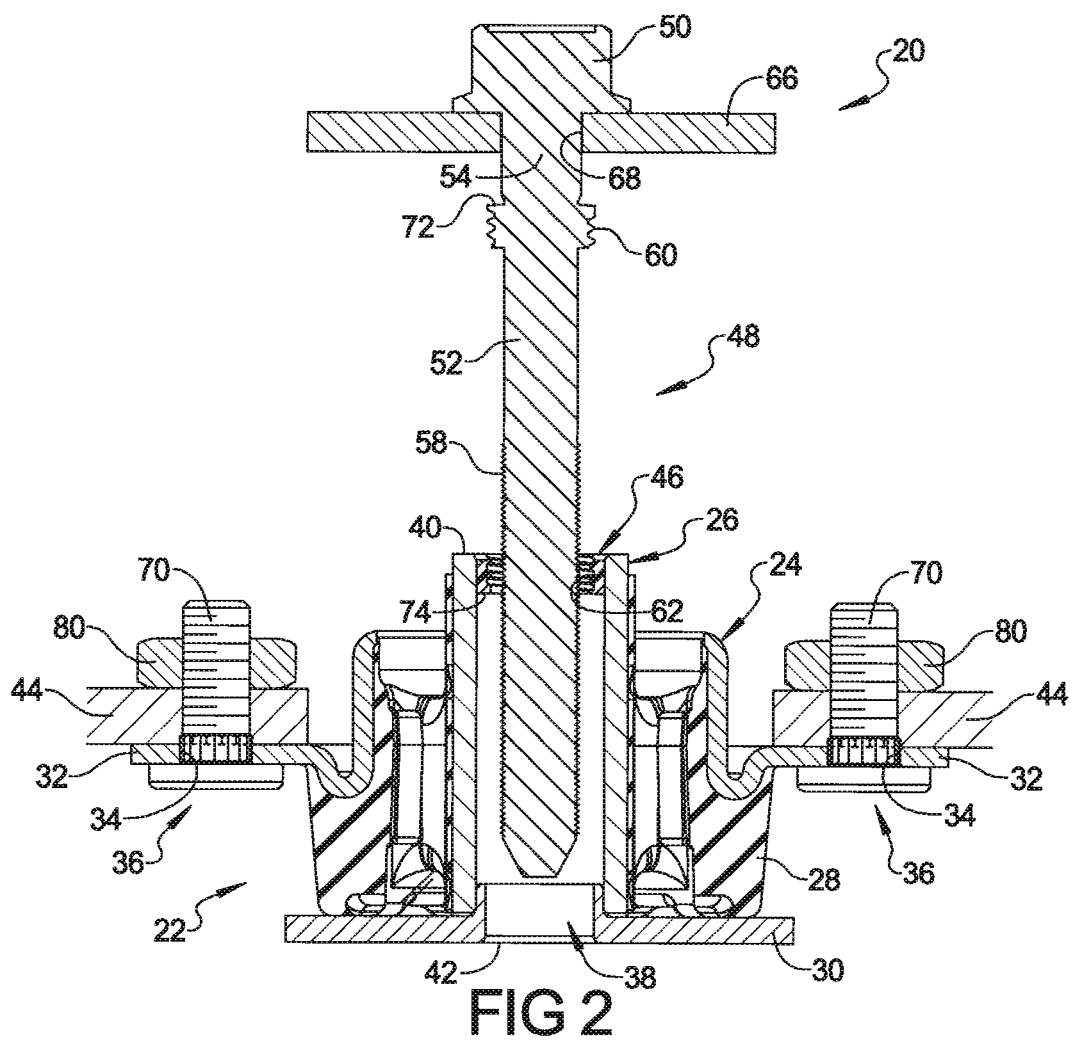
FIG. 2 is a central cross-section view of the example body isolator and bolt retention assembly of FIG. 1 in a pre-capture configuration.
Figure 3:
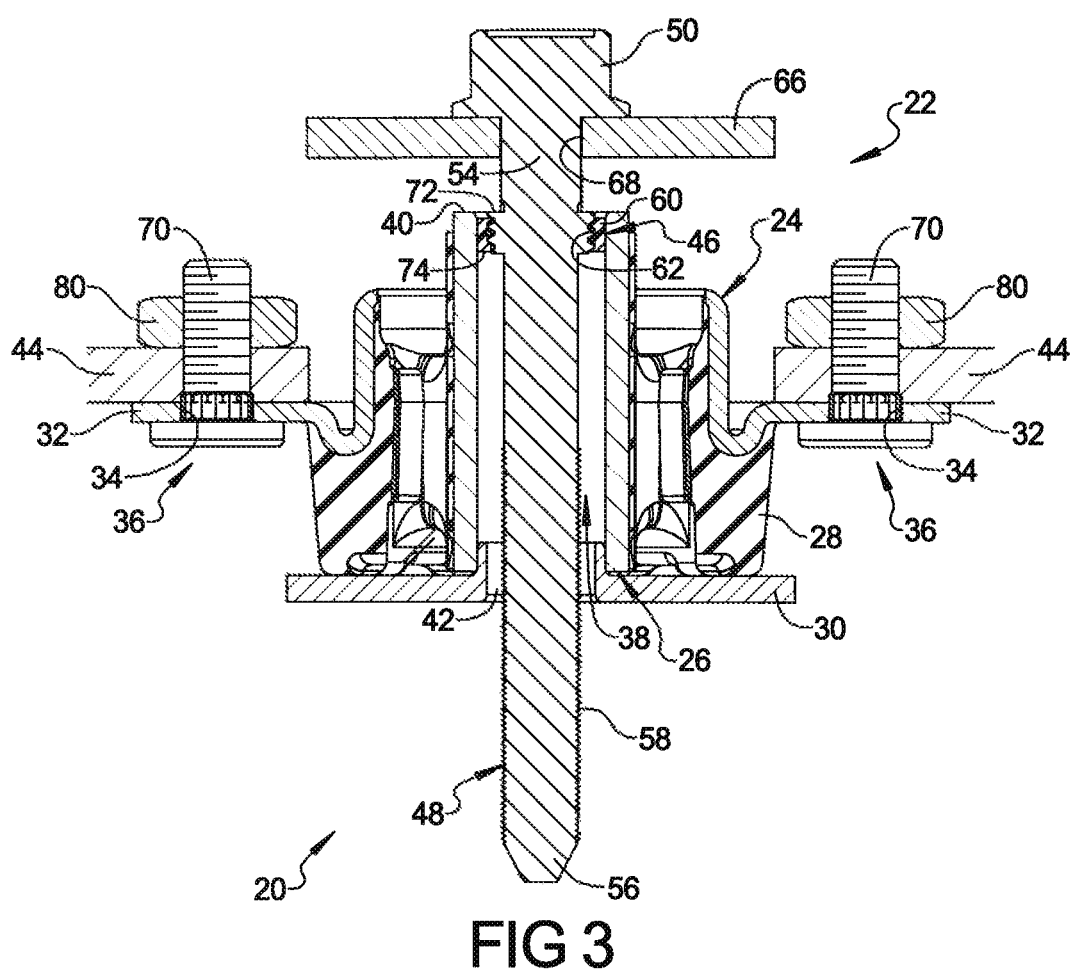
FIG. 3 is a central cross-section view of the example body isolator and bolt retention assembly of FIG. 1 in a retention thread engagement configuration.

If the bolt 48 has not been previously assembled to the body isolator 22, it is beneficial to do so while the body isolator 22 is oriented as illustrated in FIGS. 2 and 3. In FIG. 2, the example body isolator and bolt retention assembly 20 is shown in a pre-capture configuration. Specifically, the shaft 52 of the bolt 48 is moving axially into the body coupling aperture 38 of the body isolator 22. A lateral or radial gap exists between the major diameter of the external body coupling threads 58 of the bolt 48 and the minor diameter of the internal bolt retention threads 62 of the insert 46. Thus, the external body coupling threads 58 are permitted to pass axially through the internal bolt retention threads 62 without requiring threaded engagement therebetween.

This axial movement is interrupted when the external bolt retention threads 60 of the shaft 52 encounter the cooperating internal bolt retention threads 62. These threads 60, 62 are then threadably engaged with each other in a retention thread engagement configuration such as illustrated in FIG. 3.

Figure 4:
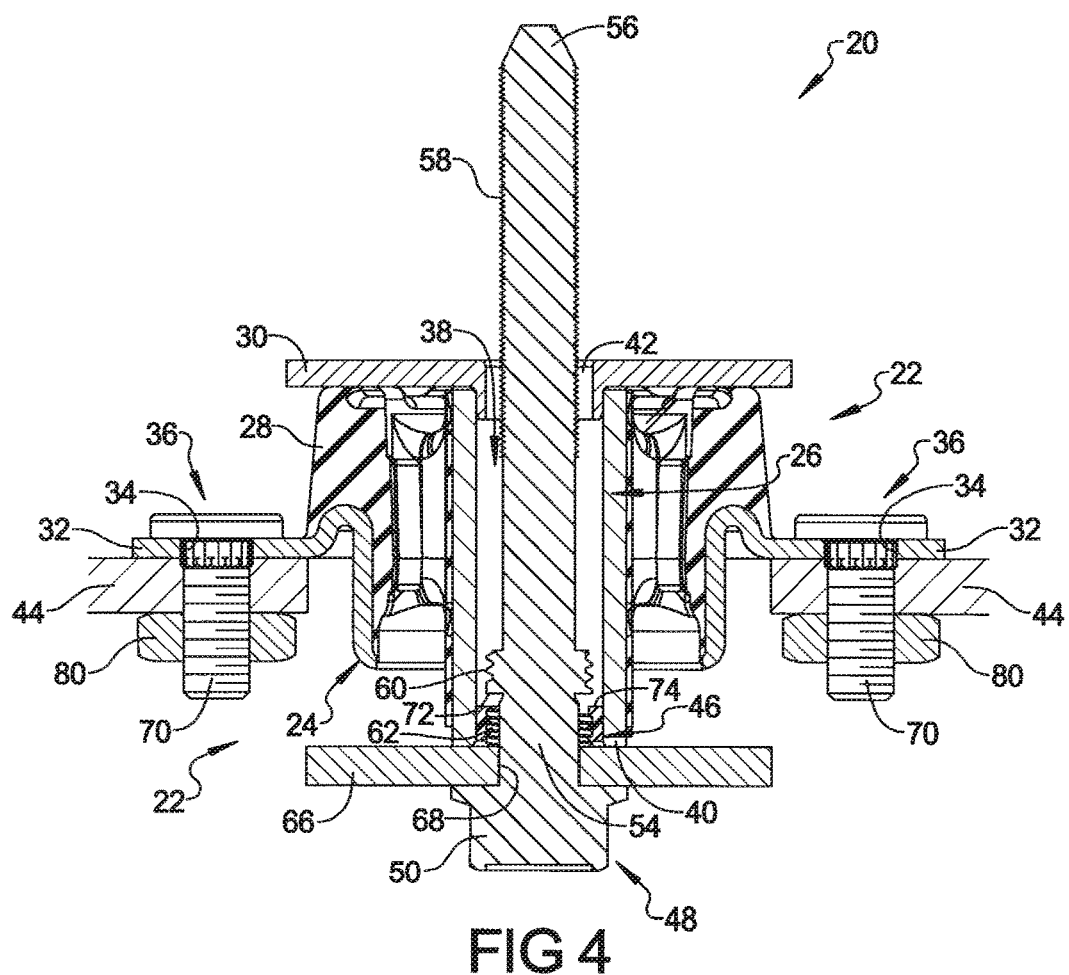
FIG. 4 is a central cross-section view of the example body isolator and bolt retention assembly of FIG. 1 in a captured floating configuration.

The cooperating bolt retention threads 60, 62 are axially positioned relative to each other to enable the entirety of the external bolt retention threads 60 to be threaded completely through the internal bolt retention threads 62 into a captured floating configuration as illustrated in FIG. 4. In an aspect, the cooperating bolt retention threads 60, 62 have a thread pitch that is larger than a thread pitch of the external body coupling threads 58. In the illustrated embodiment, for example, the external body coupling threads 58 have a thread pitch of 1.75 mm and the cooperating bolt retention threads 60, 62 have a thread pitch of 2.0 mm.

In an additional or alternative aspect, the external and internal bolt retention threads 60, 62 cooperate to enable the entirety of the external bolt retention threads 60 of the shaft 52 to be threaded completely through the internal bolt retention threads 62 of the insert in a relatively few number of threaded revolutions of the bolt 48 to facilitate relatively quick and simple movement into the captured floating configuration. In the illustrated embodiment, for example, each of the external and internal bolt retention threads 60, 62 are three complete threads permitting the bolt 48 to pass through the retention thread engagement configuration and enter the captured floating configuration in about 6 revolutions or less. In alternative embodiments, different combinations of these thread lengths permit the bolt 48 to pass through the retention thread engagement configuration and enter the captured floating configuration in about 10 threaded revolutions or less.

In this captured floating configuration, the proximal end 54 of the shaft 52 of the bolt 48 is captured between the washer 66 and the external bolt retention threads 60 internal bolt retention threads 62 of the insert 46 by the external bolt retention threads 60. Thus, the bolt 48 is captured within the body coupling aperture 38 with the external body coupling threads 58 and the distal end 56 of the shaft 52 extending out of the distal end 42 and the head 50 outside and adjacent the proximal end 40 of the body coupling aperture 38.

In the captured floating configuration, the bolt 48 is allowed to float laterally or radially within the body coupling aperture 38. In the illustrated embodiment, for example, the central body coupling aperture 38 has a diameter at its distal end 38 of about 16.2 mm, and the diameter of the bolt 48 laterally adjacent this distal end 38 in the captured floating configuration is about 12 mm; permitting about 2.1 mm of lateral float in any direction from a laterally or radially central position of the bolt 48 within the body coupling aperture 38.

In the illustrated embodiment, the relationship between the major diameter of the external bolt retention threads 60 and the diameter of the body coupling aperture 38 adjacent the external bolt retention threads 60 in the captured floating configuration is also such that about2.1 mm of lateral float is permitted in any direction from a laterally or radially central position of the bolt 48 within the body coupling aperture 38. Similarly, the relationship between the minor diameter of the internal bolt retention threads 62 and the diameter of the bolt 48 adjacent the internal bolt retention threads 62 in the captured floating configuration is also such that about 2.1 mm of lateral float is permitted in any direction from a laterally or radially central position of the bolt 48 within the body coupling aperture 38.

In alternative embodiments, one or two of these or similar adjacent diameter pairs defines the limit of the lateral or radial float, wherein one or more of these or similar adjacent diameter pairs remain spaced from each other. In alternative embodiments, one are all of the relevant adjacent diameter pairs defines the limit of the lateral or radial float and the limit is at least about 2.0 mm.

In an aspect, the cooperating external and internal bolt retention threads 60, 62 are axially positioned relative to each other to additionally allow limited axial movement of the bolt 44 within the body coupling aperture 38 when the assembly 20 is in the captured floating configuration. In the illustrated embodiment, for example, the proximal end 72 of the external bolt retention threads 60 are positioned in opposing adjacent relationship to the distal end 74 of the internal bolt retention threads 62 or the insert 46. When the assembly 20 is oriented as illustrated in FIG. 3 in the captured floating configuration of FIG. 4, these two adjacent thread ends 72, 74 are axially spaced from each other with the washer 66 and head 50 preventing the bolt 48 from falling out the distal end 42 of the body coupling aperture 38. This axial space, gap or clearance allows limited axial movement of the bolt 44 within the body coupling aperture 38 that facilitates lateral compliance of the bolt 44 during assembly and final torque of the body 64 to the frame 44.

As indicated above, the assembly 20 is assembled from the pre-assembly configuration (FIG. 2) through the threaded engagement configuration (FIG. 3) into the captured floating configuration (FIG. 4). This process is also reversible without damage to any of the component parts. Specifically, the assembly 20 can be disassembled from the captured floating configuration (FIG. 4) into the pre-assembly configuration (FIG. 2) by reverse-threading the entirety of the external bolt retention threads 60 completely through the internal bolt retention threads 62.

Figure 5:
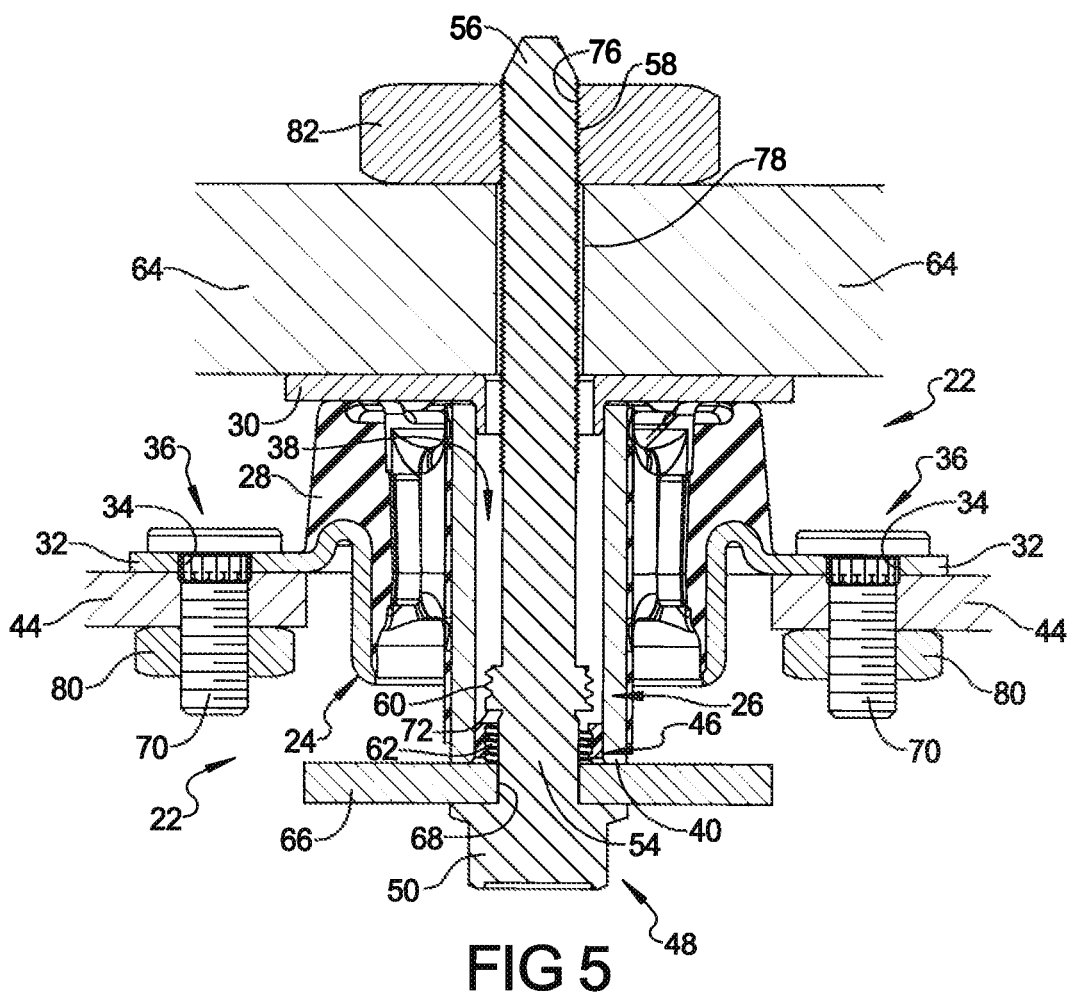
FIG. 5 is a central cross-section view of the example body isolator and bolt retention assembly of FIG. 1 in a fully assembled configuration.

FIG. 5 illustrates the assembly 20 in a final assembly configuration including a body coupling nut 82 that cooperating internal body coupling threads 76. These internal body coupling threads 76 of the nut 82 are threadably engaged with the external body coupling threads 58 of the bolt 48 and tightened to prevent both axial and lateral movement of the bolt 48 within the body coupling aperture 38. In an aspect, a plurality of assemblies 20 are typically coupled to the frame 44 in the captured floating configuration and oriented as illustrated in FIG. 4. The body 64 includes a corresponding plurality of apertures 78 therein. The body 64 is positioned over the frame 44 and moved relatively toward the frame 44. The kuka point distal end 56 of each bolt 48 engages a corresponding body aperture 78. Even though there is some variable relative lateral or radial positioning or tolerance variations between the central positions of each bolt 48 and body aperture 78, the bolts 48 are able to float laterally or radially to automatically account for such variations as the bolts 48 are inserted into the body apertures 78. Thereafter, the internal body coupling threads 76 of the body coupling nut 82 are threadably engaged with the external body coupling threads 58 of the bolt 48 and tightened to bring the assembly 20 into the final assembly configuration (FIG. 5).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A body isolator and bolt retention assembly for a body on a frame vehicle, the body isolator bolt retention assembly comprising:
    a body isolator including an outer sleeve, an inner sleeve, and a resilient material extending between and coupling the inner and outer sleeves together, the inner sleeve including a body coupling aperture extending therethrough and having a proximal end and a distal end;
    internal bolt retention threads adjacent the proximal end of the body coupling aperture;
    a bolt including a head and a shaft, the shaft having a proximal end adjacent the head and an opposite distal end, the bolt having cooperating external bolt retention threads adjacent the proximal end of the shaft and having external body coupling threads adjacent the distal end of the shaft, the external body coupling threads have a major diameter that is smaller than a minor diameter of the internal bolt retention threads to permit the external body coupling threads to pass through the internal bolt retention threads without requiring threaded engagement therebetween;
    wherein the internal and cooperating external bolt retention threads are axially positioned relative to each other to enable the entirety of the external bolt retention threads to be threaded completely through the internal bolt retention threads to capture the bolt within the body coupling aperture in a captured floating configuration in which the external body coupling threads and the distal end of the shaft extend out of the distal end of the body coupling aperture and the bolt is allowed to float laterally within the body coupling aperture.

2. The body isolator bolt retention assembly of claim 1, wherein the internal bolt retention threads are provided on an annular insert press-fit into the body coupling aperture.

3. The body isolator bolt retention assembly of claim 2, wherein the annular insert is a molded plastic insert.

4. The body isolator bolt retention assembly of claim 1, wherein the internal and external bolt retention threads have a thread pitch that is larger than a thread pitch of the external body coupling threads.

5. The body isolator bolt retention assembly of claim 1, wherein the internal and external bolt retention threads cooperate to enable the entirety of the external bolt retention threads to be threaded completely through the internal bolt retention threads in less than about 10 threaded revolutions of the bolt.

6. The body isolator bolt retention assembly of claim 1, wherein the outer sleeve includes at least one flange portion having a plurality of frame coupling apertures.

7. The body isolator bolt retention assembly of claim 1, wherein the further comprising a washer mounted via a washer aperture on the shaft between the head and the external bolt retention threads, the washer aperture having a diameter that is less than the major diameter of the external bolt retention threads.

8. The body isolator bolt retention assembly of claim 1, wherein the internal and cooperating external bolt retention threads are axially positioned relative to each other to additionally allow axial movement of the bolt within the body coupling aperture in the captured floating configuration.

9. The body isolator bolt retention assembly of claim 1, wherein, in the captured configuration, the bolt is allowed to float laterally within the body coupling aperture a distance of at least about 2.0 mm from a central position in any direction.

10. The body isolator bolt retention assembly of claim 1, wherein the bolt is removable from the body coupling aperture by reverse-threading the entirety of the external bolt retention threads completely through the internal bolt retention threads.

11. The body isolator bolt retention assembly of claim 1, wherein the body isolator bolt retention assembly additionally has a retention thread engagement configuration in which the internal and external bolt retention threads are threadably engaged with each other.

12. The body isolator bolt retention assembly of claim 1, wherein the body isolator bolt retention assembly additionally has a final assembly configuration in which a body coupling nut having cooperating internal body coupling threads, and the internal and external body coupling threads are tightened to prevent both axial and lateral movement of the bolt within the body coupling aperture.

* * * * *